United States Patent Office 2,744,941
Patented May 8, 1956

2,744,941

POLYIODINATED BENZOTRIFLUORIDES

Robert J. Hartle, Worthington, and Glenn W. Kinzer, Columbus, Ohio, assignors, by mesne assignments, to American Bosch Arma Corporation, a corporation of New York No Drawing. Application March 4, 1953, Serial No. 340,382

4 Claims. (Cl. 260—651)

This invention relates to halogenated aromatic compounds. More particularly, it relates to iodinated benzotrifluorides and halo-substituted derivatives thereof, and also to a process for preparing such materials.

Although the direct iodination of aromatic compounds has been known, there has not heretofore been disclosed the direct iodination of benzotrifluoride in which more than one atom of iodine is substituted for hydrogen on the aromatic ring. It has now been found that by the process of this invention stable polyiodinated compounds can be prepared which have a high density and a low melting point. While the exact composition of these materials is not completely known, an iodine analysis indicates that it is essentially a mixture of polyiodobenzotrifluorides.

It has further been found that these materials have a low vapor pressure, and that they are noncorrosive and nonconductive. All of these properties make them very suitable for use as suspending media for instruments. The materials are also suitable as dielectric media.

Accordingly, it is one of the objects of this invention to provide a material which has a high density in its liquid phase.

A further object is to provide a stable material having a low melting point.

Yet another object is to provide a method of polyiodinating benzotrifluorides and the halo-substituted derivatives thereof.

Other objects and advantageous features will be apparent from the following detailed description.

In general, the process of this invention comprises the direct iodination of benzotrifluoride wherein iodine atoms are substituted for an average of at least two of the hydrogen atoms of the benzene nucleus. The benzotrifluoride starting material may also have one or more of these hydrogen atoms replaced by some other halogen atom prior to iodination, and such halogen substituted derivatives are intended to be included in the term "benzotrifluorides."

The iodination is accomplished by reaction of benzotrifluoride with an iodinating mixture consisting of finely ground iodine and an oxidizing iodine compound dissolved in concentrated sulfuric acid. Suitable oxidizing iodine compounds include iodic acid, iodic acid anhydride and potassium iodate. Other materials will suggest themselves to those skilled in the art.

It is important that an excess of iodine be present in the reaction. This excess must be sufficient to prevent iodylation. However, it has been found that undesirable side reaction products are formed when the ratio of the molecular proportions of the iodine is less than four times that of the oxidizing compound.

It is further necessary that the temperature during the iodination reaction be maintained between 60° and 100° C. At temperatures higher than 100° C. excessive decomposition occurs. Reacting at temperatures less than 60° C. results in lower density materials, indicating the formation of monoiodinated compounds.

It has been also found that heating the reaction product in contact with bright copper at temperatures of from 150° to 250° C. will remove any active halogen atoms, thereby reducing corrosive properties of the materials. The copper should be in some finely divided form such as turnings, powder, etc.

The following examples illustrate the invention with greater particularity:

Example 1

To a slurry of 912 g. of finely ground iodine in 720 ml. of concentrated sulfuric acid was added 300 g. of iodic acid anhydride in small portion. The mixture was stirred until all of the iodine had gone into solution. This mixture was added slowly to 375 g. of benzotrifluoride so as to maintain the temperature between about 60° C. and 70° C. When the reaction was completed, the reaction mixture was allowed to cool and poured over cracked ice. Carbon tetrachloride was added to dissolve the solid reaction products and the excess iodine was destroyed by treatment with sodium bisulfite solution. The organic portion was washed with water, dried over sodium sulfate and stripped of solvent at reduced pressure. It was then heated in contact with bright copper turnings at 150° to 200° C. for two hours. The resulting material was found to have a melting point range of 65° to 75° C. and a density of 2.701 g./ml. at 85° C.

A portion of this material was placed in an oven held at a temperature of 100° C. for 170 hours. There was no indication of decomposition.

Corrosivity was tested by sugmerging in the material strips of copper plated with lead and maintaining for 40 hours at a temperature of 120° C. Very slight tarnish was noted on the surface of the strips and less than $3 \times 10^{-6}$ in. of the plating was removed.

As has been previously pointed out, this process may also be used to iodinate compounds in which one or more of the hydrogen atoms attached to the ring carbon atoms has been replaced by a halogen atom. An example of such a starting material is m-bromobenzotrifluoride. The following examples illustrate the iodination of this compound.

Example 2

381 g. of finely ground iodine was added to 1 liter of concentrated sulfuric acid. The resulting suspension was stirred rapidly while 160.5 g. of finely ground potassium iodate was added in small portions for 1.5 hours. The mixture was stirred for 0.5 hour, after which 205 g. of m-bromobenzotrifluoride was added dropwise to the solution during a 1-hour period. The reaction mixture was heated for an additional hour at 70° C. and allowed to cool. It was then poured over 2 kg. of crushed ice. Chloroform was added to dissolve the solids and the free iodine was discharged with sodium bisulfite. The chloroform layer was dried and the solvent stripped off at reduced pressure. This residue was placed in a sintered glass filter, and the contents of the filter were warmed to 75° to 80° C. The liquid portion was then sucked through. The filtrate was heated with 10 g. of bright copper turnings at 200° C. for 5 minutes, and then filtered while hot through a glass frit. The filtrate had a freezing point of 49–50° C. and a density of 2.789 g./ml. at 85° C.

Example 3

The same quantities of reactants and procedure for mixing were used as in Example 2, except that the entire m-bromobenzotrifluoride charge was added at one time instead of dropwise. The mixture was slowly heated to 85° C. and then allowed to cool slowly with stirring. The reaction product was worked up as in Example 2, and the crude product was then dissolved in 800 ml. of benzene and passed through a column of activated alumina which removed remaining traces of corrosive impurities such as free iodine and acidic oxidation products. The resulting solution was refrigerated at 0° C. for two days. The higher melting fraction crystallized out and was filtered off. The filtrate was stripped of benzene at reduced pressure, and the lower melting fraction was heated with 10 per cent by weight of copper turnings at 200° C. for 15 minutes and filtered while hot. The filtrate had a freezing point at 55° C. and a density of 2.816 g./ml. at 85° C.

It has also been found that by decreasing the molar ratio of the iodinating agent to that of the benzotrifluoride, there is a resulting increase in the amount of material in the reaction product having a freezing point below 75° C. However, too low a ratio will result in a material having a low density.

*Example 4*

377 g. of finely divided iodine was suspended in 1320 cc. of concentrated sulfuric acid. To this was added 159 g. of potassium iodate in small portions during a period of 1 hour. 270 g. of m-bromobenzotrifluoride was added during a 1-hour period. During this time, the temperature did not exceed 70° C. The mixture was stirred for an additional five minutes and poured over crushed ice. The aqueous phase was decanted, fresh water was added, and the mixture was heated with stirring until the organic portion melted. Free iodine was removed by repeated working with 30 per cent NaOH solution. The mixture was allowed to cool and the solid product was filtered off and dried. This material had a melting range of 54° to 60° C. and a density of 2.736 g./ml. at 85° C. Subsequent treatment as in Example 3 did not materially change these properties.

As can be seen by the preceding description, there has been produced a mixture of polyiodinated compounds selected from the group consisting of benzotrifluorides and the halo-substituted derivatives thereof. These materials have a freezing point of not greater than 75° C. and a density not less than 2.5 g./ml. at 85° C.

What is claimed is:

1. In the manufacture of high density liquids having a freezing point not greater than 75° C. the process which comprises heating to a temperature within the range of 60°–100° C. a mixture of iodine, an oxidizing iodine compound selected from the class consisting of iodic acid, iodic acid anhydride and alkali metal iodate, and a benzotrihalide selected from the group consisting of benzotrifluoride and meta-bromobenzotrifluoride in a medium of concentrated sulfuric acid, the iodine and the oxidizing iodine compound being present in molecular proportions of at least about four to one and recovering the high density polyiodobenzotrifluoride liquid thus produced.

2. The process of claim 1 followed by contacting the high density liquid with finely divided copper to render the liquid non corrosive.

3. A high density liquid reaction product having a density of not less than 2.5 g./ml. at 85° C. and having a freezing point not greater than 75° C. produced by the process comprising heating to a temperature within the range of 60° C.–100° C. a mixture of iodine, an oxidizing iodine compound selected from the class consisting of iodic acid, iodic acid anhydride and an alkali metal iodate, and a benzotrihalide selected from the group consisting of benzotrifluoride and meta-bromobenzotrifluoride in a medium of concentrated sulfuric acid, the iodine and the oxidizing iodine compound being present in molecular porportions of at least about four to one and recovering the high density polyiodobenzotrifluoride liquid thus produced.

4. A non corrosive high density liquid reaction product having a density of not less than 2.5 g./ml. at 85° C. and having a freezing point not greater than 75° C. produced by the process comprising heating to a temperature within the range of 60°–100° C. a mixture of iodine, an oxidizing iodine compound selected from the class consisting of iodic acid, iodic acid anhydride and alkali metal iodate, and a benzotrihalide selected from the group consisting of benzotrifluoride and meta-bromobenzotrifluoride in a medium of concentrated sulfuric acid, the iodine and the oxidizing iodine compound being present in molecular proportions of at least about four to one, recovering the high density polyiodobenzotrifluoride liquid thus produced and contacting said liquid with finely divided copper.

References Cited in the file of this patent

UNITED STATES PATENTS 2,174,512    Holt et al. _____ Oct. 3, 1939

OTHER REFERENCES

Booth et al.: "Jour. Am. Chem. Soc.," vol. 57, pages 2066–9 (1935).

Simons et al.: "Jour. Am. Chem. Soc.," vol. 65, pages 389–2 (1943).

McBee et al.: "Jour. Am. Chem. Soc.," vol. 73, pages 3932–4 (1951).